United States Patent [19]

Forte

[11] Patent Number: 5,406,802

[45] Date of Patent: Apr. 18, 1995

[54] PROCESS FOR THE PURIFICATION OF GASES

[75] Inventor: Paulino Forte, Yonkers, N.Y.

[73] Assignee: UOP, Des Plaines, Ill.

[21] Appl. No.: 206,580

[22] Filed: Mar. 7, 1994

Related U.S. Application Data

[63] Continuation-in-part of Ser. No. 985,077, Dec. 3, 1992, Pat. No. 5,325,672.

[51] Int. Cl.$^6$ ............................................. F25J 3/00
[52] U.S. Cl. ........................................... 62/17; 62/20
[58] Field of Search ..................................... 62/17, 20

[56] References Cited

U.S. PATENT DOCUMENTS

| | | | |
|---|---|---|---|
| 3,977,203 | 8/1976 | Hinton et al. | 62/17 |
| 4,252,548 | 2/1981 | Markbbetter et al. | 62/17 |
| 4,350,511 | 9/1982 | Holmes et al. | 62/17 |
| 4,511,381 | 6/1983 | Mehra | 62/17 |
| 4,526,594 | 9/1983 | Mehra | 62/17 |
| 4,623,371 | 7/1985 | Mehra | 62/17 |
| 4,711,651 | 12/1986 | Sharma et al. | 62/34 |
| 4,832,718 | 9/1987 | Mehra | 62/17 |
| 4,883,514 | 7/1987 | Mehra | 62/17 |
| 4,936,888 | 12/1989 | DeLong | 62/37 |
| 5,019,143 | 6/1991 | Mehrta | 62/17 |
| 5,047,074 | 7/1991 | MacGregor et al. | 55/48 |
| 5,051,120 | 8/1991 | Pahade et al. | 62/24 |

Primary Examiner—Ronald C. Capossela
Attorney, Agent, or Firm—Thomas K. McBride; John G. Tolomei; Richard P. Silverman

[57] ABSTRACT

A process is disclosed for the purification of natural gas in which the reduction of the nitrogen content of a natural gas stream is achieved by a combination of absorption, purification, flashing, and reflux steps. More specifically, the process achieves the rejection of inert components such as nitrogen from natural gas without operating in the cryogenic temperature range. The process uses a lean solvent to absorb the non-rejected components in a recovery zone of an absorber and uses a portion of the off-gas from the flashing zone to purify the rich solvent in a purification zone of the absorber. In a further embodiment, solvent entrained in off-gases from low and medium pressure flash zones is recovered in a high pressure flash zone by washing the off-gases with recovered lean solvent.

19 Claims, 4 Drawing Sheets

PROCESS FOR THE PURIFICATION OF GASES

CROSS-REFERENCE

This application is a continuation-in-part of U.S. Ser. No. 985,077, filed Dec. 3, 1992, which is herein incorporated by reference, now U.S. Pat. No. 5,325,672.

FIELD OF THE INVENTION

The present invention is a process for the purification of gases and relates to the rejection of light components from a hydrocarbon gas mixture. Particularly, the present invention relates to the rejection of nitrogen and/or hydrogen from a hydrocarbon gas stream using solvent absorption at non-cryogenic conditions. More particularly, the present invention relates to the use of a combination of solvent absorption, purification and recovery steps to provide a product natural gas having a reduced nitrogen content and a nitrogen-rich stream.

BACKGROUND OF THE INVENTION

Processes for removing light components such as hydrogen or nitrogen, from a hydrocarbon gas mixture represent a problem in petroleum processing. Typically, the hydrocarbon gas mixture is a refining off-gas or a natural gas and the presence of the light components in the mixture limit further processing, or prevent sales of the gas mixture without the removal of the light components. Often these light components include hydrogen, nitrogen, carbon dioxide, carbon monoxide and mixtures thereof. A wide variety of hydrocarbon gas mixtures are found in petroleum refineries. Some streams are integral parts of specific processes. Often these streams are recycled from a fractionation column or a separator to a reactor. One such recycle stream may be an impure hydrogen stream which must be purified before returning the stream to the reactor. Other of these streams may be by-product streams of a major hydrocarbon conversion process such as a fluid catalytic cracking unit or an ethylene plant. Processes available for the rejection of the light components from these gas mixtures can employ solvent absorption, cryogenic separation, adsorption over molecular sieve adsorbents, or membrane separation. The choice of a suitable process depends upon many factors, some of which are the product purity that is desired, the gas recovery levels, available pressure losses, pretreatment requirements, off-gas composition, impact of reaction products remaining in the light component stream, and the turndown capability of the selected process.

When natural gas is produced from a gas well or is recovered as associated gas from an oil well, the natural gas contains a number of light components which can reduce its heating value. Typically, a natural gas stream comprises nitrogen, methane, ethane, carbon dioxide, inerts, and $C_{3}+$ hydrocarbons. In order to improve the heat content of the product natural gas, the concentration of nitrogen and other inerts must be reduced. This reduction of inerts is often required to meet the quality specifications of pipeline companies that transport natural gas from a well head or natural gas processing plant to the consumer. Typically the natural gas must meet the following specifications:
Heat Content—900 to 1000 BTU
Total Inerts ($N_2$ +$CO_2$)—7 mol % maximum
Nitrogen—4 mol % maximum
Actual pipeline specifications vary somewhat depending upon the producer's contract for price and quality.

In general, a specification for a higher heating value requires a reduced amount of light components such as nitrogen and carbon dioxide. Typically, natural gas at the well head can contain between 3 and 60 mol % nitrogen, between 0.1 and 10 mol % ethane, between 0.1 and 20 mol % $C_{3}+$ hydrocarbons and between 0.1 and 20 mol % $CO_2$ with the balance being methane. Light components, of which nitrogen is typically the major component, must be removed from natural gas to improve the heat content of the gas and to meet pipeline specification.

Compositions of the raw gas and the amount of impurities that can be tolerated in the product generally determine the selection of the most suitable process for purification.

Cryogenic technology, which consists of several process variations, has traditionally been employed to separate nitrogen from natural gas. The operating principle of the process entails partially or fully liquefying the high nitrogen content feedstream under pressure and at very low temperatures (e.g., as low as $-185°$ C. ($-300°$ F.)). Afterwards, the partially or fully condensed stream is fractionated in one or two columns, which operate in tandem at two different pressures, to separate the feedstream into a rejected nitrogen stream overhead and a high methane content product stream at the bottom. After heat exchanges with the incoming feedstream, the rejected nitrogen stream is used for gas field operation, vented to atmosphere or reused. The bottom nitrogen-depleted product stream is regasified via process heat exchanges, recompressed, and delivered to the battery limits as an upgraded sales gas.

U.S. Pat. No. 4,936,888 relates to the use of cryogenic technology in an integrated dual distillation system for rejecting nitrogen in concentrations as high as 75 mol % or more from gaseous methane in a distillation system employing a high pressure fractionator and a low pressure fractionator. The low pressure fractionator accepts a feed predominantly comprising liquid nitrogen under conditions to produce a high purity nitrogen overhead stream and a high purity methane bottom stream.

U.S. Pat. No. 4,711,651 relates to a process for the separation of a high pressure gas stream such as refining gas in which the starting gas mixture is cooled and separated into a first vapor portion and a first liquid portion which is expanded to an intermediate pressure. The first vapor portion is further cooled and separated into a second vapor portion which may be further processed for ultimate recovery of a methane-rich product gas. Refrigeration is recovered from the mixed intermediate pressure stream.

U.S. Pat. No. 5,051,120 relates to the cryogenic processing of a feed containing nitrogen and methane. The method is used in treating natural gas which is contaminated with nitrogen. An improved stripping column is provided in which the methane product is produced at a higher pressure than would otherwise be possible.

Other process options have used non-cryogenic routes which employ solvent extraction. U.S. Pat. No. 4,832,718 relates to a process for processing a natural gas, a thermal or catalytic cracking gas or refining off-gas to produce a methane-rich product, a nitrogen-rich product, a hydrogen-rich stream or an olefin-rich product therefrom by solvent extraction. The process further relates to extractive flashing and extractive stripping using selective physical solvents. The process employs a solvent to separate $N_2$ from hydrocarbons by extraction (i.e., absorption) at moderate temperatures (ambient to −30° F.) and under pressure. As an $N_2$-rich gas stream and a solvent stream come in intimate contact in a packed column, the solvent dissolves nearly all of the hydrocarbons and a small amount of $N_2$ in the feed gas stream, leaving behind a rejected gaseous $N_2$ stream that contains the major fraction of the $N_2$ previously present in the feed stream and a small amount of unrecoverable hydrocarbons. The dissolved hydrocarbons are subsequently released from the rich solvent by successive pressure reductions. The gases that evolve from the pressure reductions are recompressed and recombined into an upgraded sales gas stream. The regenerated lean solvent stream is recycled to the absorber. After refrigeration recoveries, the rejected $N_2$ stream is available at a relatively high pressure and can be used for field applications, vented to the atmosphere, or reused.

U.S. Pat. No. 4,623,371 relates to the recovery of hydrocarbons from natural gas containing acidic compounds and from 3–75 mol % nitrogen to provide up to three products: nitrogen-gas product, $C_1$-rich gas product, and a $C_2+$ liquid product. The process extracts a natural gas stream with a physical solvent to produce a nitrogen stream and a methane-rich solvent stream. The methane-rich solvent stream is flashed to provide a stripped solvent stream and substantially all of the $C_1+$ hydrocarbons as a stream of flashed-off-gases. The stripped solvent is recycled to the extraction step.

U.S. Pat. No. 5,047,074 relates to a process for purging nitrogen from natural gas by passing the gas through an absorption column at elevated pressure and contacting the gas with an absorbent consisting primarily of a poly alpha olefin. The non-absorbed gas consisting predominantly of nitrogen is passed out of the absorption column to waste or to recovery. The resulting rich absorbent is desorbed to obtain the desorbed light hydrocarbons and the lean absorbent.

U.S. Pat. No. 5,019,143 relates to the use of a particular group of solvents including paraffins, naphthenes, $C_6$-$C_{10}$ aromatic compounds and dialkyl ethers of polyalkylene glycol to contact the gas feed mixture in a demethanizing absorber with a reboiler operating between 50 to 400 psig and a temperature of +10 to −40° F. for the separation of ethylene and lighter hydrocarbons from the feed with a distillation column to regenerate the rich solvent. U.S. Pat. Nos. 4,511,381 and 4,526,594 relate to the separation of natural gas from natural gas liquids with physical solvents. Natural gas liquids include hydrocarbons heavier than methane. The physical solvent used for the absorption step in U.S. Pat. No. 4,511,381 is described in terms of a solvent having a relative volatility of methane over ethane of at least 5.0 and a hydrocarbon loading capacity at least 0.25 standard cubic feet of ethane per gallon of solvent. The rich solvent stream is flashed and the gas fraction is compressed, cooled, and condensed to produce the natural gas liquids. U.S. Pat. No. 4,526,594 relates to the selective extraction of a stream of hydrocarbons that are heavier than methane from a natural gas stream with a physical solvent by selectively rejecting the consecutively lowest molecular weight portion of the extracted stream by the use of a second extraction step with a physical solvent to reject hydrocarbons heavier than methane, flashing the resulting rich solvent to separate the selected heavier hydrocarbons, and subsequently de-ethanizing the selected heavier hydrocarbons.

U.S. Pat. No. 4,883,514 relates to a process for the removal of nitrogen from nitrogen-rich gases which contain more than 3 mol % nitrogen. The nitrogen-rich gas stream is contacted with a lean oil comprised of paraffins, aromatic or cyclohydrocarbons or mixtures thereof having molecular weight between 75 and 250 at temperature no lower than −40 ° F. to produce a nitrogen stream as an overhead product and a bottoms methane-rich oil stream. The bottoms methane-rich oil stream is flashed to recover a methane-rich overhead gas product and a lean oil rich bottoms stream, and the lean oil stream is recycled to the absorption step. The patent teaches that the contacting or absorption may take place in a methane extraction column which includes a reboiler and is operable in an extractive stripping mode.

It is an object of this invention to provide a process for the rejection of nitrogen from natural gas streams using noncryogenic absorption with a hydrocarbon solvent. It is a further object of this invention to provide a process for the rejection of nitrogen from natural gas which can achieve gas recoveries of greater than 99 mol % and provides lower compression requirements, lower capital investment, and lower solvent losses than previous technology.

SUMMARY OF THE INVENTION

By the present invention a process is provided for the removal of a light component from a hydrocarbon gas mixture. The process does not require a selective solvent. Any hydrocarbon or hydrocarbon mixture with an appropriate freeze point can be used as a solvent for the process. Preferably, the freeze point of the solvent will be less than 0° C. (32° F.), more preferably less than −23° C. (−10° F.), and most preferably less than −34° C. (−30° F.). The process operates at mild low temperatures ranging from about −40° C. (−40° F.) to about ambient conditions allowing the equipment to be fabricated from carbon steel without the need for special alloys. In processing natural gas for the removal of nitrogen, hydrocarbon recoveries of greater than 99 mol % are achieved. The purity of the gas product stream or sales gas product is achieved by controlling a reflux stream returned to a purification zone. Recovery of natural gas liquids, $C_3+$, when present in the feedstream require no additional processing steps and at least a portion of the natural gas liquids in the feed may be used as at least a portion of the solvent. The process of this invention provides an economic and flexible means for rejecting a light component such as nitrogen and/or hydrogen from a hydrocarbon gas feedstream without the need for cryogenic conditions. A novel solvent recovery step reduces equilibrium solvent losses to low levels, preferably as low as 300 ppm-wt, and more preferably below 200 ppm-wt and most preferably below 50 ppm-wt.

In accomplishing the foregoing objectives and in accordance with the invention, the invention is a process for the rejection of a light component from a gas mixture thereof with hydrocarbons. The process includes a number of steps. The gas mixture is contacted with a lean solvent stream in the recovery zone to provide a light component rich stream and a first rich solvent stream. The first rich solvent stream is passed to a purification zone and therein the first rich solvent stream is countercurrently contacted with a light gas stream to displace the light component from the first rich solvent stream and to provide a second rich solvent stream. The second rich solvent stream is flashed in a flash zone to provide a gas product stream and the lean solvent stream.

The light component is selected from the group consisting of hydrogen, nitrogen, carbon dioxide, carbon monoxide, and mixtures thereof. The gas mixture is a natural gas or a refining off-gas stream with nitrogen and/or hydrogen. In a further step, lean solvent is recovered from the gas product to minimize solvent losses. At least a portion of the gas product is returned to the purification zone to provide the light gas stream as a reflux stream in the purification zone. The recovery zone and the purification zone may be located in a single absorber column.

In another embodiment, the invention is a process for separating nitrogen from a natural gas stream comprising nitrogen and methane and the process is accomplished through a series of steps. The natural gas stream is passed to a recovery zone. The natural gas is contacted with a lean solvent stream in the recovery zone to provide a nitrogen-rich stream and a first rich solvent stream. The first rich solvent stream is passed to a purification zone. In the purification zone, the first rich solvent stream is countercurrently contacted with a reflux stream and a second rich solvent stream is withdrawn therefrom. The second rich solvent stream is flashed in a first flashing zone of a series of consecutive flashing zones at a first flashing zone pressure and a first flashing zone temperature effective to provide a lean solvent stream and a nitrogen-reduced stream. At least a portion of the lean solvent stream is recycled to the recovery zone. The nitrogen-reduced stream is Withdrawn at a product pressure to provide a nitrogen-reduced product. At least a potion of the nitrogen-reduced product is passed to the purification zone to provide the reflux stream.

In a further aspect of the invention, a process for the separation of nitrogen from a natural gas stream comprising nitrogen and methane comprises a number of steps. The natural gas stream at a feed pressure is passed to a recovery zone. The natural gas stream is countercurrently contacted with a lean solvent stream in the recovery zone to provide a nitrogen stream and a first rich solvent stream. The nitrogen stream is withdrawn. The first rich solvent stream is passed to a purification zone. The first rich solvent stream is countercurrently contacted therein with a reflux stream and a second rich solvent stream is withdrawn therefrom. The second rich solvent stream is passed to a high pressure flash zone, the high pressure flash zone being maintained at a high pressure of between about 1/5 and about ½ of a product pressure to provide a high pressure off-gas and a high pressure liquid. The high pressure liquid is passed to a medium pressure flash zone, the medium pressure flash zone being maintained at a medium pressure of between about 1/5 and about ½ the high pressure of the pressure flash zone to provide a medium pressure off-gas and a medium pressure liquid. The high pressure off-gas stream is passed to a first stage of at least a two-stage compressor having a first stage and a second stage and the medium pressure off-gas stream is passed to the second stage of the compressor to raise the pressure of the off-gas streams to the product pressure to provide a product gas stream. The medium pressure liquid is passed to a low pressure flash zone, said low pressure flash zone being maintained at a pressure of between about 1/5 and about ½ the medium pressure of the medium pressure flash zone to provide a low pressure off-gas and the lean solvent stream. The low pressure off-gas is recompressed to provide a compressed off-gas stream. A portion of compressed off-gas stream is passed to the purification zone to provide the reflux stream in the purification zone, and the product gas stream is withdrawn.

In a still further aspect of the invention, a process for separating nitrogen from a natural gas stream comprising nitrogen and methane comprises a series of process steps. The natural gas stream is passed to an absorber. The absorber has an upper recovery zone and a lower purification zone. The natural gas stream enters the absorber at a point between the recovery zone and the purification zone. The natural gas stream is countercurrently contacted with a lean solvent stream in the upper recovery zone to provide a nitrogen stream and a first rich solvent stream. The nitrogen stream is withdrawn therefrom. The first rich solvent stream is passed to the lower purification zone in the absorber. The first rich solvent stream is countercurrently contacted therein with a reflux stream and a second rich solvent stream is withdrawn. The second rich solvent stream is passed to a high pressure flash zone at conditions effective to provide a high pressure liquid, and a combined gas stream comprising lean solvent is introduced to the high pressure flash zone. The high pressure liquid is contacted with the combined gas stream to provide a high pressure off-gas essentially free of lean solvent. The high pressure liquid is passed to a medium pressure flash zone at conditions effective to provide a medium pressure off-gas and a medium pressure liquid. The medium pressure liquid is passed to a low pressure flash zone at conditions effective to provide a low pressure off-gas and the lean solvent stream. The low pressure off-gas is passed to a first stage of at least a 3-stage compressor having the first stage, a second stage, and a third stage. The medium pressure off-gas is passed to the second stage of the 3-stage compressor. The combined gas stream is withdrawn from the second stage of the 3-stage compressor and a product gas stream is withdrawn from the third stage. At least a portion of the product gas is passed to the purification zone to provide the reflux stream.

Other aspects of this invention include the cooling of the reflux stream prior to the passing of the reflux stream to the purification zone. In addition, the second rich solvent stream, the high pressure liquid stream and the medium pressure liquid stream each can be passed to separate hydraulic power recovery turbines to recover hydraulic energy from these streams before passing them to the respective flashing operations.

DETAILED DESCRIPTION OF THE INVENTION

Figure 1:
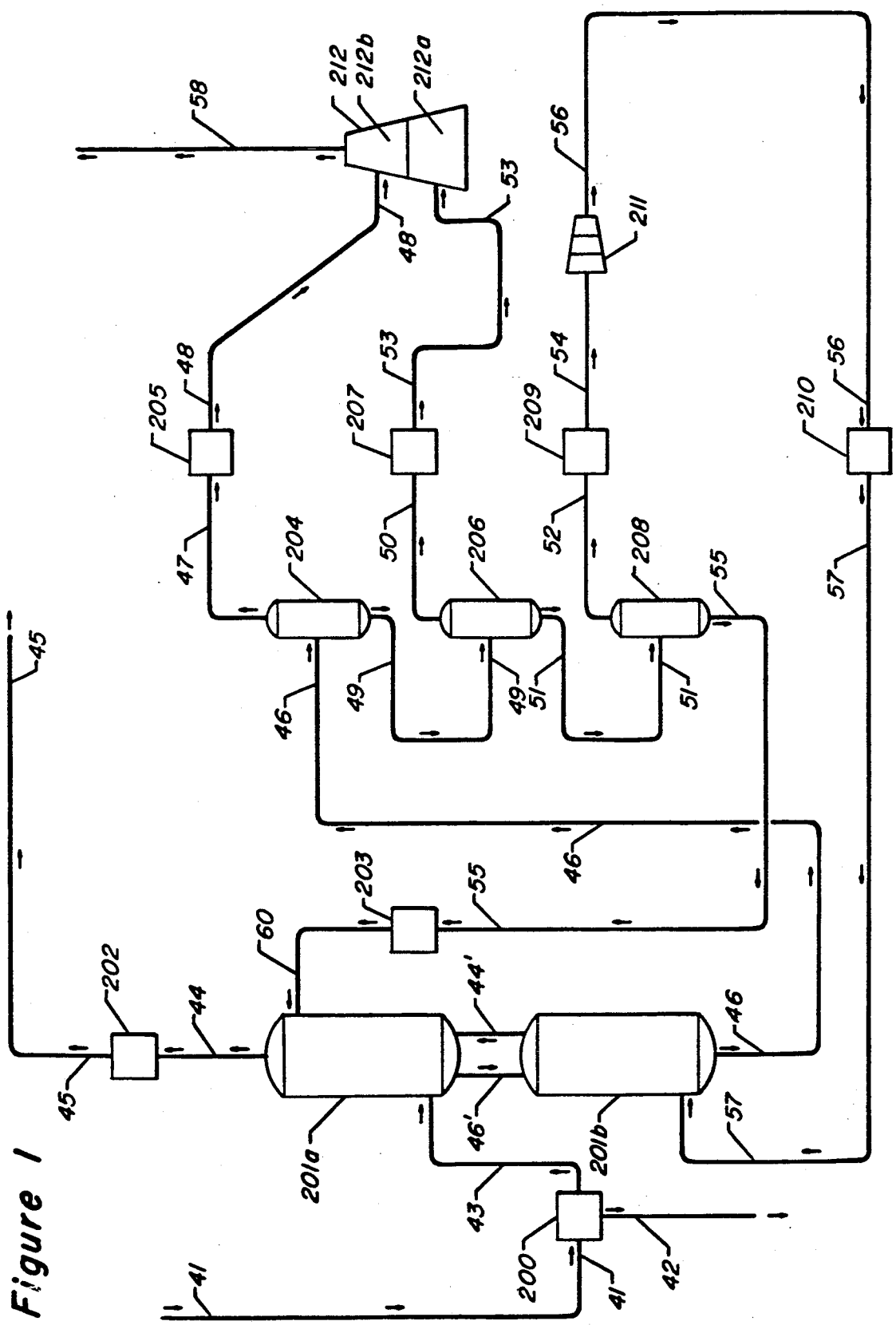
FIG. 1 is a schematic flowsheet of the process of the instant invention with a 2-stage compressor.

The process of the present invention is useful for purifying methane- or ethylene-containing streams. In general, typical feedstreams will contain water up to saturation levels, less than 25 mol % $C_2$-$C_5$ hydrocarbons, less than 30 mol % carbon dioxide and less than 2 mol % $C_6$ and higher hydrocarbons and a number of other impurities such as nitrogen or hydrogen. Natural gas is a common source of such impurity-containing methane, and in natural gas the hydrocarbon impurities are primarily the saturated type such as ethane and propane. Additionally, natural gas can contain other components such as nitrogen, hydrogen, carbon dioxide, helium and argon, although such other components are not appreciably absorbed in the process of the present invention. These other components which were unabsorbed in the process would become part of the light gas product withdrawn from the absorption zone. In some cases, these other components, such as carbon dioxide, helium, hydrogen, and argon, may be present in amounts which justify their recovery from the light component, or nitrogen stream. For example, in the separation of nitrogen from natural gas in the instant process, the nitrogen product may be sent to downstream processing such as membrane separation, pressure swing or thermal swing adsorption, cryogenic processing and combinations thereof for the further recovery of these other components from the nitrogen. Typically, the feedstream will contain from about 40 to 97 mol % methane, from about 3 to 60 mol % $N_2$, from about 0.1 to 10 mol % ethane, from about 0.1 to 20 mol % $C_3+$ hydrocarbons and from about 0.1 to 20 mol % $CO_2$.

The term theoretical tray or stage refers to an ideal stage of equilibrium separation. In a theoretical stage the light phase leaving the stage is in vapor/liquid equilibrium with the heavy phase leaving the same tray. The actual number of trays employed in any separation is typically greater than the number of theoretical trays, because vapor/liquid equilibrium typically is not achieved on a single actual tray. The number of stages or trays presented here are expressed in numbers of theoretical trays.

The process of the present invention will hereinafter be described with reference to the drawings. It should be also understood that the representative temperatures and pressure set forth herein, with relation to the description of the drawing and the examples, are illustrative only and are not to be considered limiting. The particular temperatures and pressures used in a particular separation will be dependent upon the nature and composition of the feed stream, upon the particular heat exchange surface area available, and upon the initial temperatures and pressures of the feed stream.

FIG. 1 is a schematic flowsheet of the process of the current invention. With reference to FIG. 1, a feedstream 41 at a feedstream pressure essentially equal to the absorption pressure is charged to a cold box 200 wherein the temperature of the feedstream is reduced to an absorption temperature ranging from about $-40°$ to about $-12°$ C. (about $-40°$ to about 10° F.) and where a portion of any condensed liquid hydrocarbons may be removed in stream 42. Preferably, the condensed liquid hydrocarbons remain in the cooled feedstock. The cooled feedstock is then introduced to a recovery zone 201A via line 43. In the recovery zone, the cooled feedstock is countercurrently contacted with a lean solvent stream 60. The lean solvent enters the top of the recovery zone 201A.

The lean solvent may be any solvent material such as hydrocarbons having 9 to 14 carbon atoms per molecule selected from the group consisting of paraffins, isoparaffins, olefins, mono-olefins, naphthenes, olefinic naphthenes, alkylbenzenes, aromatics and mixtures thereof. In addition, hydrocarbons such as kerosines and diesels, can be used as the lean solvent. The above-mentioned solvent materials can be employed separately or as mixtures. Furthermore, the solvent or mixture can be admixed with natural gas liquids. The mount of natural gas liquids admixed with the lean solvent is preferably maintained at a concentration to depress the freeze point of the mixture of lean solvent to freeze point temperature of less than about $-17°$ C. (0° F.). If desired, a portion of the lean solvent can be withdrawn from the process and flashed at conditions well-known to those skilled in the art to recover a portion of the natural gas liquids in the lean solvent, and return the lean solvent to the process of the Applicant's invention.

A nitrogen-rich gas is withdrawn from the top of the recovery zone in stream 44. The nitrogen-rich gas is then passed from line 44 through a cold box exchanger 202 and released at ambient conditions via line 45 at a temperature ranging from about 10 to about 27° C. (about 50° to about 80° F.). The nitrogen-rich gas may be vented to the atmosphere or used in other operations. A first rich solvent stream 46' is withdrawn from the bottom of the recovery zone 201A and passed to a purification zone 201B wherein the first rich solvent stream is countercurrently contacted with a reflux stream 57, and a second rich solvent stream 46 is withdrawn from the bottom of the purification zone. Preferably, the recovery zone will contain two or more equilibrium stages to achieve the desired separation of the light component from the feedstream. The purification zone will contain one or more equilibrium stages to achieve the desired displacement of light component from the second rich solvent. Any light component displaced from the first rich solvent stream is returned to the recovery zone in line 44'.

The second rich solvent stream is passed by line 46 to a first flash zone of a series of consecutive flash zones. Preferably, there will be between 1 and 4 separate flash zones and most preferably 2 to 3 separate flash zones. The number of separate flash zones selected will depend upon the feed pressure. The first flash zone will operate at the highest pressure. The temperature of the consecutive flashing zones ranges from about 46° to 0° C. (about $-50°$ to about 32° F.). The second rich solvent stream is passed to a high pressure flash zone 204 wherein a temperature and a pressure effective to separate the second rich solvent stream into a high pressure off-gas 47 and a high pressure liquid 49 is maintained. Preferably, the pressure of the high pressure flash zone is maintained between about 1/5 and ½ of the pressure of the sales gas product 58, if the pressure of sales gas product is less than the feed gas pressure. If the pressure of the sales gas product is greater than the pressure of the feedstream, then the preferred pressure of the high pressure flash is ½ to 1/5 the pressure of the feedstream. The high pressure liquid is passed by line 49 to a medium pressure flash zone 206 wherein the high pressure liquid is flashed at conditions effective to produce a medium pressure off-gas in line 50 and a medium pressure liquid in line 51. Preferably, the pressure of the medium pressure flash zone is maintained between about 1/5 to about ½ of the pressure of the high pressure flash zone. The high pressure off-gas in line 47 is passed to a cold box exchanger 205 to recover refrigeration wherein the high pressure off-gas is heated from a temperature of between about −34° and about −29° C. (about −30° and −20° F.) to a temperature of between about 15° and about 27° C. (about 60° and about 80° F.) and passed by line 48 to a second stage 212B of a two-stage compressor. The medium pressure off-gas in line 50 at a temperature of about between about −37° and about −32° C. (about −35° and about −25° F.) is passed to a cold box exchanger 207 to recover refrigeration wherein the medium pressure off-gas is heated to a temperature of between about 15° and about 27° C. (about 60° and about 80° F.) and passed to a first stage 212A of the two-stage compressor 212 via line 53. A sales gas product at high pressure is withdrawn in line 58 from the two-stage compressor. The pressure of the sales gas product is typically dictated by the presstire of the pipeline to which the gas is returned. Pipeline pressures typically range from 4500 to about 13,800 kPa (650 to about 2000 psia). Typically, the high pressure product gas temperature will range between about 32° and about 43° C. (about 90° and 110° F.). Returning to the medium pressure flash zone 206, the medium pressure liquid in line 51 is passed to a low pressure flash zone 208 to provide a low pressure off-gas which is withdrawn in line 52, and a lean solvent stream which is withdrawn in line 55. The lean solvent in line 55 is passed to cold box exchanger 203 to reduce the temperature of the lean solvent to a range between ambient temperature and about 40° C. (40° F.). The cooled lean solvent is passed to the top of the recovery zone via line 60. The low pressure flash is maintained at a temperature and pressure effective to separate the medium pressure liquid into the low pressure off-gas and the lean solvent. Preferably, the low pressure flash zone is maintained at a pressure of about 1/5 to about ½ the pressure of the medium pressure flash zone. The low pressure off-gas, at a temperature of between about −37° and about −32° C. (about −35° and about −25° F.), is passed in line 52 to a cold box exchanger 209 to recover refrigeration wherein the low pressure off-gas is heated to a temperature between about 15° and about 27° C. (about 60° and about 80° F.) and withdrawn in line 54. The low pressure off-gas is then passed to a three stage compressor 211 to compress the low pressure off-gas and provide a compressed light gas stream in line 56. The temperature of the compressed light gas stream in line 56 is typically between about 32° and about 49° C. (about 90° and about 120° F.). The compressed light gas stream is then passed to cold box 210 where the temperature of the light gas stream is reduced to a temperature of between about −32° to about −26° C. (about −25° and −15° F.) and the light gas stream is recycled to the purification zone 201B by line 57.

In accordance with the present invention, the absorption pressure is generally from about 345 to about 13,800 kPa (about 50 to about 2000 psia) and preferably from about 1030 to about 6900 kPa (about 150 to about 1000 psia), and most preferably from about 2070 to about 4200 kPa (about 300 to about 600 psia). Suitable operating temperatures are generally within the range of from about −40° to about −0° C. (about −40° to about 32° F.).

Typically, the feedstock temperature ranges between about 16° and about 32° C. (about 60° and about 100° F.). The cooled feedstock temperature ranges between ambient and about −40° C. (about −40° F.) before it is charged to the recovery zone. The lean solvent temperature charged to the top of the recovery zone 201A is preferably at a temperature ranging from about ambient to about −40° C. (about −40° F.), wherein in the ambient temperature ranges from about 15° to about 43° C. (about 60° to about 110° F.).

The lean solvent preferred for the invention is a hydrocarbon having between 10 and 14 carbon atoms per molecule selected from the group consisting of natural gas liquids, paraffins, iso-paraffins, olefins, mono-olefins, naphthenes, olefinic naphthenes, alkylbenzenes, aromatics, kerosines, and diesels, and mixtures thereof. The criteria for using these solvents in the process of the instant invention are that the solvents are $C_9$-$C_{14}$ hydrocarbons, preferably $C_{10}$-$C_{14}$ hydrocarbons or mixtures thereof with boiling points of about 300° F. or greater, and freezing points of about 0° C. (32° F.) or lower. Kerosines and diesels and petroleum distillates and paraffinic solvents with an initial boiling point above about 150° C. (300° F.) also may be used as solvents in the instant invention. If the freezing point of the solvent is higher than 0° F., a portion of natural gas liquids comprising light hydrocarbons, ranging from $C_2$ to $C_6$ hydrocarbons may be admixed with the solvent to depress the freezing point of the solvent to less than about 0° C. (32° F.), the desired temperature range of operation. The more preferred lean solvent is a paraffin hydrocarbon having between 10 and 14 carbon atoms per molecule in pure form or in mixtures thereof with natural gas liquids. Preferably, the lean solvent in pure form or in mixtures has a freeze point of less than −17° C. (0° F.).

Figure 2:
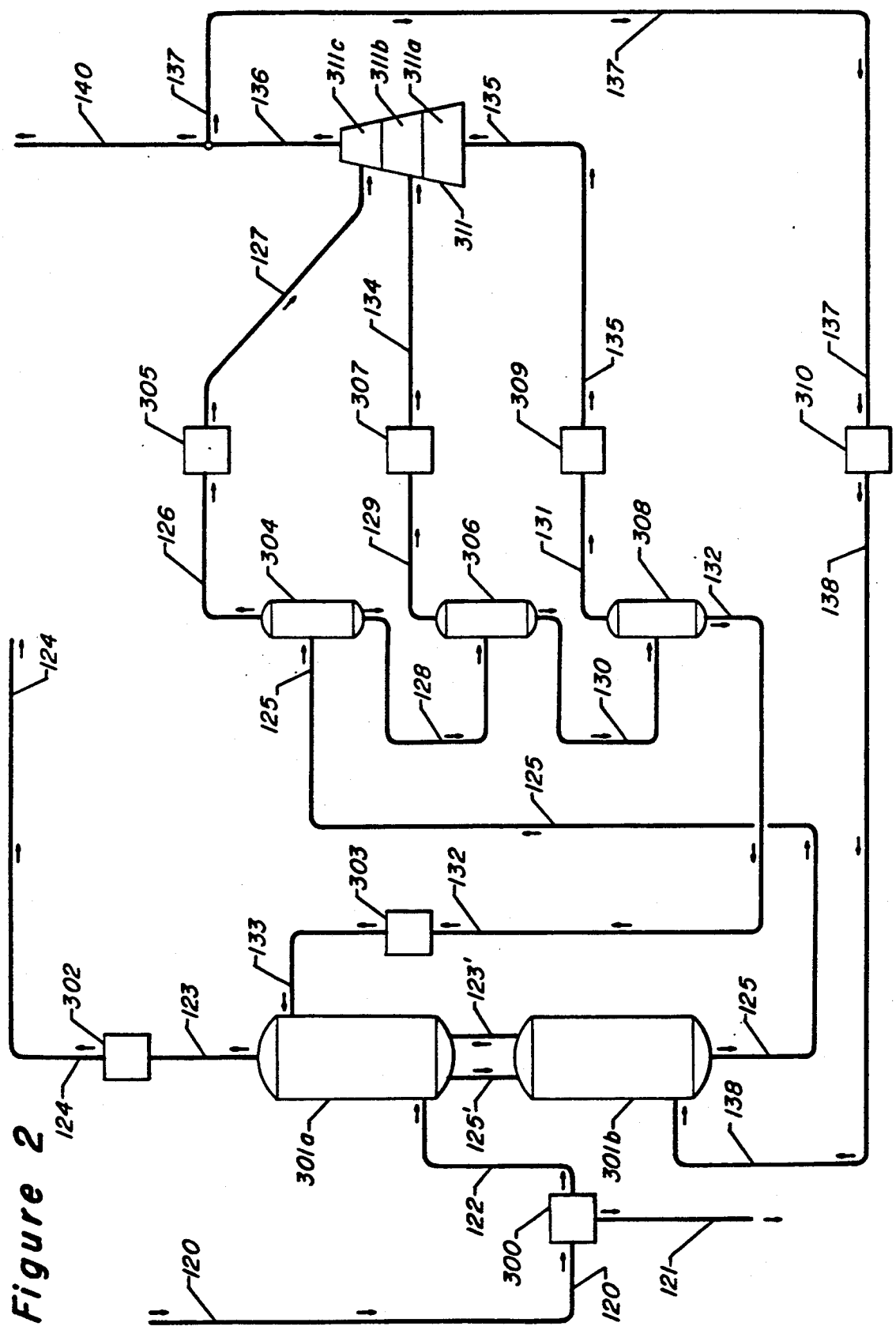
FIG. 2 illustrates the process with a 3-stage compressor.

FIG. 2 is a schematic flowsheet of the nitrogen rejection system of the current invention wherein a portion of the product gas is used to reflux the purification zone. A feedstock in line 120 is passed to a cold box exchanger 300 at a temperature of between about 15° and about 32° C. (about 60° and about 90° F.). In the cold box exchanger, the feedstock is cooled to a temperature ranging between about −40° to about −29° C. (about −40° to about −20° F.) to condense any liquids from the feedstock. A portion of the condensed liquids may be withdrawn in line 121, but preferably, at least a portion of the condensed liquid and the cooled feedstock are passed via line 122 to the bottom of a recovery zone 301A. In the recovery zone, the feedstock is countercurrently contacted with a lean solvent stream which is introduced at the top of the recovery zone at a temperature of between about −40° to about −29° C. (about −40° and about −20° F.) in line 133. A nitrogen-rich gas is withdrawn via line 123 and passed to cold box exchanger 302 wherein the temperature is raised from about −40° to about −29° C. (about 40° to about −20° F.) to a temperature of about 15° to about 27° C. (about 60° to about 80° F.) and released to the atmosphere via line 124. A first rich solvent stream is withdrawn from the recovery zone 301A and passed to a purification zone 301B via line 125'. In the purification zone the first rich solvent stream is countercurrently contacted with a light gas stream 138 which enters at the bottom of the purification zone to displace an additional amount of nitrogen-rich gas. The additional amount of nitrogen-rich gas stream comprising nitrogen and a portion of the light gas stream is withdrawn from the purification zone via line 123' and passed to the recovery zone. A second rich solvent stream is withdrawn from the bottom of the purification zone in line 125 and passed to a first flash zone in a series of consecutive flash zones. The second rich solvent stream at a temperature of between about −34° and about −12° C. (about −30° to about 10° F.) is passed to the first or high pressure flash zone 304 via line 125. In the high pressure flash zone 304, conditions are maintained at a temperature and pressure effective to produce a high pressure off-gas which is withdrawn in line 126 at a temperature typically ranging from about −40° to about −15° C. (about −40° to about 5° F.) and a pressure of about 1/5 to ½ the pressure of the product gas 140, to provide a high pressure liquid which is withdrawn via line 128. The high pressure liquid is passed to a medium pressure flash zone 306 which is maintained at a temperature and a pressure effective to produce a medium pressure off-gas which is withdrawn via line 129 and a medium pressure liquid which is withdrawn via line 130. The temperature of the medium pressure flash zone ranges from about −43° to about −15° C. (about −45° to about 5° F.) and a pressure of about 1/5 to ½ the pressure of the high pressure flash zone. The medium pressure liquid is passed to a low pressure flash zone 308 which is maintained at a temperature and a pressure effective to produce a low pressure off-gas which is withdrawn via line 131 and to provide a low pressure liquid, or lean solvent stream which is withdrawn via line 132. The temperature of the low pressure flash zone ranges from about −43° to about 15° C. (about −45° to about 5° F.) and a pressure of about 1/5 to ½ of the pressure of the medium pressure flash zone. The relative pressures in the flash zones are maintained at these ratios to maximize gas compression efficiencies between the consecutive flash zones. The lean solvent stream is passed via line 132 to cold box exchanger 303 wherein the lean solvent is cooled and passed to the recovery zone in line 133. The high pressure off-gas is passed from line 126 to cold box exchanger 305 wherein the high pressure off-gas is heated from a temperature ranging from between −25° and −30° F. to a temperature ranging between about 15° to about 27° C. (about 60° to about 80° F.) to recover refrigeration, and is withdrawn in line 127. Similarly, the medium pressure off-gas in line 129 is heated in cold box exchanger 307 to a temperature of between about 15° to about 27° C. (about 60° to about 80° F.) to recover refrigeration and withdrawn in line 134. Likewise, the low pressure off-gas in line 131 is heated in cold box exchanger 309 to a temperature of between about 15° to about 27° C. (about 60° to about 80° F.) to recover refrigeration and is withdrawn in line 135. The high pressure off-gas stream in line 127 is passed to a third stage 311C of a 3-stage compressor 311, the medium pressure off-gas stream in line 134 is passed to a second stage 311B of 3-stage compressor 311 and the low pressure off-gas in line 135 is passed to a first stage 311A of 3-stage compressor. The three stage compressor compresses these off-gas streams in stages 311A, 311B and 311C, respectively, to produce a compressed off-gas stream which is withdrawn in line 136. A portion of the compressed off-gas stream is withdrawn in line 140 as a product gas, and at least a portion of the compressed off-gas is passed via line 137 as a light gas stream to be returned to the purification zone. Preferably, the portion of the compressed off-gas which is countercurrently contacted with the first rich solvent stream in the purification zone ranges from 1 to 99 mol %, preferably 1 to 80 mol % and most preferably 1 to 60 mol % of the feedstock passed to the recovery zone depending on the amount of nitrogen in the feed and the degree of purification required. The portion of the compressed off-gas, or light gas stream returned to the purification zone or reflux can be expressed as a ratio of the molar flow of the light gas stream, to the feed molar flow. Preferably, the reflux-to-gas ratio in the purification zone should be maintained at a value above 0 and less than 0.8, preferably the reflux-to-gas ratio will be maintained at a level between 0.05 and about 0.5. This light gas strum is passed via line 137 to cold box exchanger 310 wherein the temperature is reduced from a temperature of about 32° to about 49° C. (about 90° to 120° F.) to a temperature of between about −32° and about −26° C. (about −25° to about 15° F.) and withdrawn via line 138. The light gas stream is then passed via line 138 to the bottom of the purification zone 301B as the reflux stream to countercurrently contact the first rich solvent stream.

It will be understood by one skilled in the an that the cold box exchangers illustrated in FIGS. 1 and 2 can be combined to take advantage of heat exchange benefits throughout the process.

Figure 3:
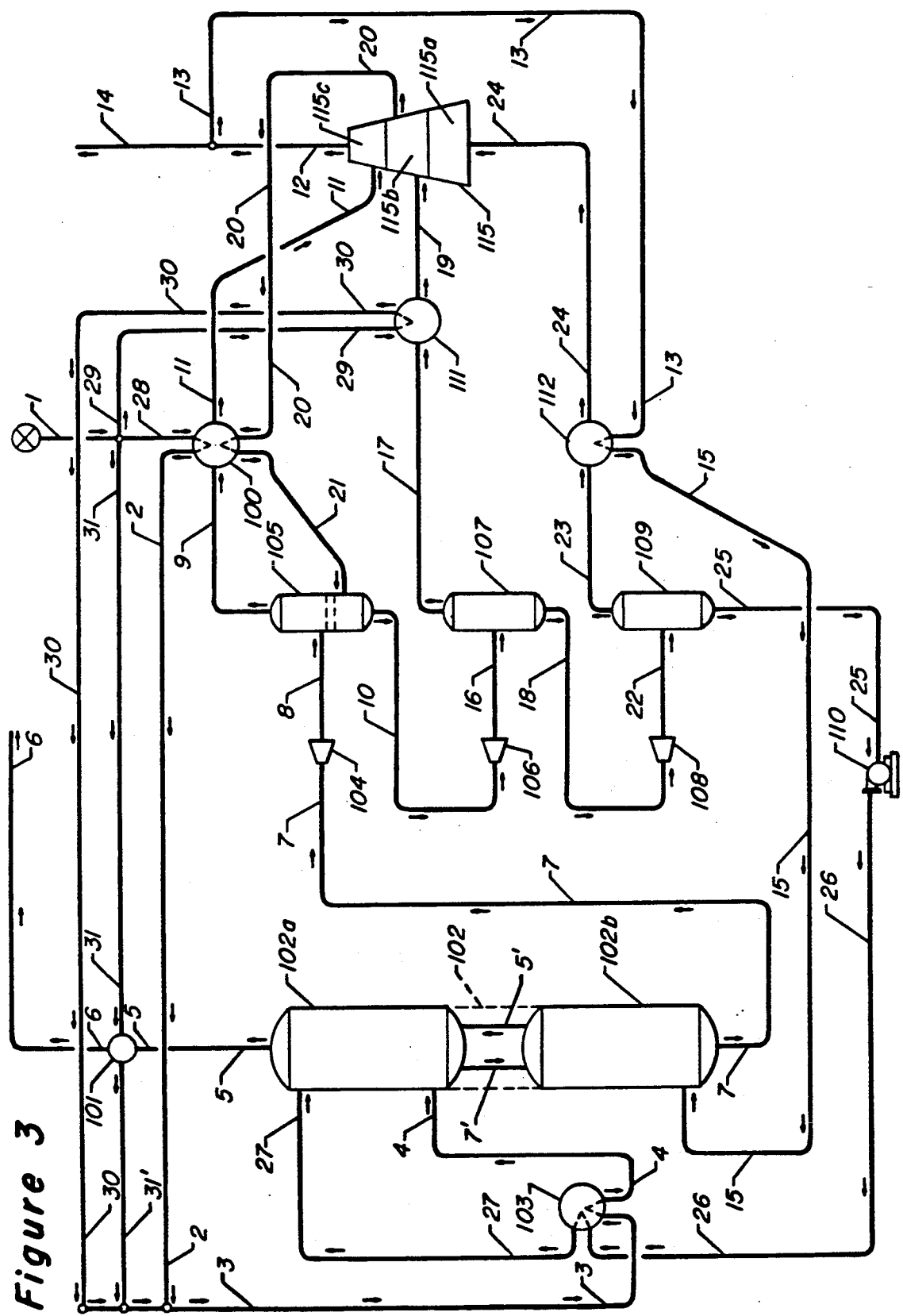
FIG. 3 illustrates the process with a 3-stage compressor and lean solvent recovery.

FIG. 3 illustrates a schematic flowscheme of the present invention wherein some of the cold box exchangers have been combined to effect an efficient operation, and hydraulic power recovery turbines have been utilized to conserve energy. The scheme uses a 3-stage compressor wherein at least a portion of the high pressure liquid from the high pressure flash zone is used in a solvent recovery step to remove lean solvent from a combined stream of the compressed low and medium pressure off-gases in the high pressure flash zone to reduce overall solvent losses from the process. The first and second stages of the compressor are used to provide the combined compressed low and medium pressure off-gas stream. The combined low and medium pressure off-gas stream is contacted with the high pressure liquid in the high pressure flash zone. In addition, a portion of the product gas is used to reflux the purification zone.

FIG. 3 is a schematic flowsheet of a nitrogen rejection scheme of the present invention having a recovery zone and the purification zone in a single absorber column, wherein the absorber column has an upper recovery zone and a lower purification zone, and using the high pressure flash to remove solvent from the low pressure and medium pressure off-gas. A natural gas feedstock at a temperature of between about 26° and about 49° C. (about 80° and about 120° F.) and a pressure of between about 690 to about 2410 kPa (about 100 to about 350 psia) is passed to the process via line 1. The feedstock is split into at least three streams to take advantage of heat and refrigeration recovery opportunities in the process. A first portion of the feedstock is passed via line 29 to exchanger 111 wherein the first portion is cross-exchanged with the medium pressure off-gas stream in line 17 to cool the feedstream and the cooled portion of the feedstream is returned via line 30 to line 3. A second portion of the feedstream in line 28 is exchanged with the high pressure off-gas stream 9 in exchanger 100 to produce a cooled feedstream 2 which is subsequently combined in line 3 with the remaining portions of the feedstream. A third portion of the feedstream is passed via line 31 to exchanger 101 wherein the feedstream is cooled to produce stream 31' which is subsequently combined with the other portions of the feedstream in line 3. Stream 3 is passed to a refrigeration unit 103 and a chilled feedstream is passed to a recovery zone 102A of an adsorber 102 via line 4. The chilled feedstream enters the adsorber at a point between the recovery zone 102A and the purification zone 102B. The point at which the chilled feedstream enters the adsorber will depend upon the degree of separation to be obtained in each section. As a minimum, there will be at least two theoretical trays in the recovery zone and at least one theoretical tray in the purification zone. Within the recovery zone 102A, the chilled feedstream is countercurrently contacted with a lean solvent stream 27 introduced at the top of the recovery zone. A nitrogen-rich stream is withdrawn via line 5 and passed to exchanger 101 wherein the nitrogen-rich stream is heated to ambient conditions to recover refrigeration and released to the atmosphere via line 6. A first rich solvent stream in line 7' is withdrawn from the recovery zone 102A and passed to the purification zone 102B wherein any excess nitrogen is displaced from the rich solvent stream by the countercurrent contacting of the first rich solvent stream with a reflux stream 15 comprising light gas introduced at the bottom of the purification zone. The displaced nitrogen stream comprising nitrogen and light gases is returned to the recovery zone via line 5'. A second rich solvent stream is withdrawn from the bottom of the purification zone via line 7 and passed to a hydraulic power recovery turbine 104. The hydraulic power recovery turbine 104 recovers some of the hydraulic energy in the second rich solvent stream by reducing the pressure from the pressure of the purification zone which operates in a pressure range similar to the feedstream pressure to a pressure of the high pressure flash zone 105. The second rich solvent stream, now reduced in pressure, is passed via line 8 to high pressure flash zone 105. The high pressure flash is maintained at conditions of temperature and pressure effective to produce a high pressure liquid and a high pressure off-gas stream. The second rich solvent enters the high pressure flash zone and provides an off-gas stream which is removed via line 9 and a high pressure liquid which flows over an effective number of trays within the high pressure flash zone and is contacted with a compressed gas stream in line 21. The trays in the high pressure flash zone provide a contacting area with the high pressure flash zone to facilitate the removal of lean solvent from the compressed gas stream. Preferably 1 to 5 theoretical trays can be effective to reduce solvent losses from the high pressure flash zone. The compressed gas stream is a combination of a low pressure and a medium pressure off-gas stream which comprises solvent. The high pressure liquid stream is then passed via line 10 to a second hydraulic power recovery turbine 106 which recovers hydraulic energy from the high pressure liquid as the pressure of the high pressure liquid is reduced to the pressure of the medium pressure flash zone. The high pressure liquid is then passed from the second hydraulic power recovery turbine via line 16 to the medium pressure flash zone 107. The medium pressure flash zone is maintained at a temperature and a pressure effective to produce a medium pressure off-gas stream comprising solvent which is withdrawn out of line 17 and a medium pressure liquid which is withdrawn in line 18. The medium pressure liquid is passed to a third hydraulic power recovery turbine 108 which recovers hydraulic energy from the medium pressure liquid, and the medium pressure liquid, is subsequently passed via line 22 to a low pressure flash zone 109. The low pressure flash zone is maintained at a temperature and pressure effective to provide a low pressure off-gas comprising solvent which is removed via line 23 and a lean solvent which is removed via line 25. Lean solvent is passed via line 25 to lean solvent pump 110. The lean solvent is then pumped via line 26 to refrigeration unit 103 wherein the temperature of the lean solvent is reduced, and a cooled lean solvent is passed in line 27 to the top of the recovery zone 102A.

The medium pressure gas is passed in line 17 to exchanger 111 wherein the medium pressure gas is heated to recover refrigeration and conveyed via line 19 to a second stage 115B of a 3-stage compressor 15. The low pressure off-gas in line 23 is passed to exchanger 112 to recover refrigeration which heats the low pressure off-gas. The heated low pressure off-gas is passed to the first stage 115A of the 3-stage compressor via line 24. A combined low pressure and medium pressure off-gas stream comprising lean solvent is passed from the second stage of the compressor 115B via line 20 to exchanger 100 wherein the combined gas is cooled. The cooled combined gas is then passed to the bottom of the high pressure flash zone 105 via line 21. The high pressure off-gas in line 9, essentially free of solvent, is passed to exchanger 100 wherein the high pressure off-gas is heated to a temperature ranging from about 15° to about 27° C. (about 60° to about 80° F.) and passed via line 11 to the third stage of the 3-stage compressor 115C. A compressed product gas is withdrawn from the third stage of the 3-stage compressor in line 12. At least a portion of the product gas is withdrawn via line 13 and passed to exchanger 112 wherein the portion is cooled from a temperature of about 32° to about 49° C. (90° to about 120° F.) to a temperature of about −40° to about −23° F. (about −40° to about −10° F.) in line 15 as the reflux stream. The reflux stream in line 15 is passed to the bottom of the purification zone 102B. The remaining portion of the product gas from line 12 is withdrawn as product gas in line 14.

It was discovered that a minimal amount of solvent was carried over as equilibrium losses in the high pressure flash zone, while increasing amounts of solvent were carried over in the medium and low pressure flash zones of the consecutive flash scheme. As a result, 1 to 3 theoretical trays, preferably at least 1 theoretical tray, was provided in the high pressure flash zone 105. The second rich solvent stream was introduced in the high pressure flash zone above the trays. The second rich solvent stream flashes and the resulting high pressure liquid is countercurrently contacted on the trays with a combined off-gas stream comprising the compressed low pressure and medium pressure off-gas streams which were introduced to the high pressure flash zone at a point below the trays. It is believed that this countercurrent contacting in the high pressure flash zone acts to remove solvent from the combined off-gas stream at the conditions of the high pressure flash to provide a high pressure off-gas essentially free of lean solvent. Preferably the high pressure off-gas essentially free of solvent, will contain less than 300 ppm, and more preferably less than 100 ppm, and most preferably less than 50 ppm solvent which permits the process scheme to reject nitrogen from the natural gas stream while maintaining the amount of solvent in the product gas and the overall solvent loss at a very low level, preferably less than 300 ppm and most preferably less than 100 ppm.

The hydraulic power recovery turbines 104, 106 and 108 are used to recover hydraulic energy from the second rich solvent stream, the high pressure liquid, and the medium pressure liquid before these streams are subsequently flashed in the consecutive flash zones. Energy recovered from these hydraulic power recovery turbines can be used to partially drive the lean solvent pump 110 in order to offset some of the hydraulic power requirements for the lean solvent pump.

Refrigeration unit 103 is preferably a propane refrigeration unit operating in a range of from about $-46°$ to about $-12°$ C. (about $-50°$ to about $10°$ F.). In order to minimize overall processing costs, it is preferred to use equipment which could be constructed of carbon steel and employ a propane refrigeration system.

The invention will be further clarified by a consideration of the following examples based on engineering design simulation models, which are intended to be purely exemplary of the use of the invention.

EXAMPLE I

Example 1 is based on the process for separating nitrogen from a mixture of natural gas and nitrogen in the scheme depicted in FIG. 3 wherein the purification zone was refluxed with a portion of the product gas. The feedstream was a natural gas available at a pressure of 2310 kPa (335 psia) with the following composition (mol %):

| | |
|---|---|
| Nitrogen | 13.71 |
| Methane | 85.99 |
| Ethane | 0.30 |
| Water | 13 ppm |

The above composition of the natural gas has a $C_2+$ content which is low enough that natural gas liquids do not condense out from the feed in the nitrogen rejection process. If the concentration of $C_2+$ material in the natural gas is greater than this amount, some prior art processes would require an additional liquid recovery step to remove the natural gas liquids. The instant invention does not require any additional recovery steps to remove condensed liquids. Any condensed liquids in the instant process become part of the solvent and aid in the separation.

The objective of the process was to reduce the nitrogen content of the product gas to less than 3 mol % while maintaining a high recovery of the nitrogen-depleted product gas. The results of an engineering design calculation based on a small natural gas upgrading facility with an inlet gas capacity of 0.54 million $Nm^3$ per day (20 million SCF per day) are shown in Table 1 for a $C_9$ paraffin solvent.

Using the $C_9$ paraffin solvent, a solvent to feedstock gas molar ratio of 6.0 at a reflux-to-feedstock gas ratio of 0.07, the amount of nitrogen in the sales gas product was reduced to 1.7 mol %, while recovering 99.3 mol % of the natural gas in the feedstock. The separation required at least eight equilibrium stages in the recovery zone and at least two equilibrium stages in the purification zone. The energy requirements of the process expressed in BHP per mol of gas recovered was 1.35. The results of Example I indicated a total loss of solvent at a level of 498 ppm. No solvent recovery step was provided in Example I.

TABLE 1

NITROGEN REJECTION FROM NATURAL GAS PRODUCT USED TO PURIFY RICH SOLVENT

| PROCESS VARIABLES | | $C_9$ |
|---|---|---|
| Solv/Gas Ratio | (molar) | 6.0 |
| Reflux/Gas Ratio | (molar) | 0.07 |
| Natural Gas Recovered | (mol %) | 99.3 |
| $N_2$ In Nat. Gas Rec. | (mol %) | 1.7 |
| $N_2$ In Gas Rejected | (mol %) | 95.3 |

TABLE 1-continued

NITROGEN REJECTION FROM NATURAL GAS PRODUCT USED TO PURIFY RICH SOLVENT

| PROCESS VARIABLES | | $C_9$ |
|---|---|---|
| HP Flash Pressure | (psia) | 140.0 |
| MP Flash Pressure | (psia) | 42.0 |
| LP Flash Pressure | (psia) | 12.0 |
| Gas Compressor | (stages) | 3 |
| Absorber Stages | (recovery/purification) | 8/2 |
| Total Solvent Losses | (ppm-wt) | 498 |
| Solvent Temperature | (°C.) | −34 |
| Gas Compression | (BHP) | 1945 |
| Propane Refrigeration | (BHP) | 188 |
| LS Pump (actual-recov) | (BHP) | 403 |
| TOTAL BHP REQUIRED BY PROCESS | | 2536 |
| BHP PER LB-MOL OF GAS RECOVERED | | 1.35 |

EXAMPLE II

Example II is based on the feedstock of Example I and a $C_9$ paraffin solvent and the flowscheme shown in FIG. 3 wherein the low pressure and medium pressure off-gases are compressed and returned to the high pressure flash zone in a solvent recovery step and at least a portion of the nitrogen-depleted gas product is used to reflux the purification zone. The results are shown in Table 2 in the column headed $C_9$ paraffin. Although there was little change in the overall energy requirements from the results of Example I, in Example II the total solvent losses were reduced to 300 ppm from the 498 ppm of Example I which represented about a 40% reduction in the solvent losses compared to Example I.

TABLE 2

COMPARISON OF REFLUX SCHEMES IN NITROGEN REJECTION PROCESS

| PROCESS VARIABLES | | $C_9$ Paraffin |
|---|---|---|
| Solv/Gas Ratio | (molar) | 6.0 |
| Reflux/Gas Ratio | (molar) | 0.07 |
| Natural Gas Recovered | (mol %) | 99.3 |
| $N_2$ In Nat. Gas Rec. | (mol %) | 1.7 |
| $N_2$ In Gas Rejected | (mol %) | 95.3 |
| HP Flash Pressure | (psia) | 140.0 |
| MP Flash Pressure | (psia) | 42.0 |
| LP Flash Pressure | (psia) | 12.0 |
| Gas Compressor | (stages) | 3 |
| Absorber Stages | (recovery/purification) | 8/2 |
| Total Solvent Losses | (ppm-wt) | 300 |
| Gas Compression | (BHP) | 1888 |
| Propane Refrigeration | (BHP) | 233 |
| LS Pump (actual-recov) | (BHP) | 402 |
| TOTAL BHP REQUIRED BY PROCESS | | 2523 |
| BHP PER LB-MOL OF GAS RECOVERED | | 1.34 |

EXAMPLE III

Example III is based on the feedstock of Example I and the flowscheme shown in FIG. 3. Table 3 shows the performance of the process using heavier, higher molecular weight solvent compared to the $C_9$ paraffinic solvent of Example II. The performance for $C_{10}$, a paraffinic solvent with 10 carbon atoms per molecule and $C_{12}$, a mono-olefin with 12 carbon atoms per molecule are shown in Table 3. The results in the column headed $C_{10}$ showed that the solvent losses could be reduced to 94 ppm, a 69% reduction compared to the $C_9$ paraffin case with a 300 ppm solvent loss. The solvent resulted in a 96% reduction in solvent losses with a solvent loss of 13 ppm.

Thus, the use of the higher molecular weight, lower volatility solvent significantly reduced the solvent losses while slightly reducing the solubility of the natural gas in the solvent in a scheme with a solvent recovery zone. The apparent reduction in gas solubility caused an increase in the solvent-to-gas ratio from 6 to 6.2 (a 3% increase) for $C_{10}$ and from 6 to 7.1 (an 18% increase) for $C_{12}$. Thus, the resulting loss in selectivity for the absorption of the light hydrocarbons from the use of the heavier solvent resulted in a slight increase of nitrogen in the hydrocarbon gas recovered. The resulting energy requirements remained essentially unchanged for $C_{10}$. However, the energy requirement for the $C_{12}$ solvent increased 7.5% over the $C_9$ paraffin present in the No-reflux case. The results of this comparison using the $C_9$ paraffinic solvent are shown in Table 4 under the heading Refluxed and No-reflux. Both schemes produced a product gas with a natural gas recovery in excess of 99 mol % and had a solvent loss of 300 ppm. The no-reflux performance showed a slightly lower gas compression requirement (3%) at 1.30 BHP per mole of gas recovered. The nitrogen impurity in the product gas of the no-reflux case was 2.7%, compared to the nitrogen impurity of 1.7% in the refluxed case, representing an improvement of 40% in the reduction of nitrogen in the gas product. Therefore, without the purification zone, represented by the additional stages and the reflux operation, the process would have limited ability to control the purity of the gas product for changes in feedstock composition or changes in solvent composition.

TABLE 4

ADVANTAGE OF REFLUX TO PURIFICATION ZONE IN NITROGEN REJECTION PROCESS

| PROCESS VARIABLES REFLUX | | REFLUXED | NO |
|---|---|---|---|
| Solv/Gas Ratio | (molar) | 6.0 | 6.0 |
| Reflux/Gas Ratio | (molar) | 0.07 | 0.0 |
| Natural Gas Recovered | (mol %) | 99.3 | 99.4 |
| $N_2$ In Nat. Gas Rec. | (mol %) | 1.7 | 2.7 |
| $N_2$ In Gas Rejected | (mol %) | 95.3 | 95.4 |
| HP Flash Pressure | (psia) | 140.0 | 140.0 |
| MP Flash Pressure | (psia) | 42.0 | 42.0 |
| LP Flash Pressure | (psia) | 12.0 | 12.0 |
| Gas Compressor | (stages) | 3 | 3 |
| Absorber Stages | (recovery/purification) | 8/2 | 8/0 |
| Total Solvent Losses | (ppm-wt) | 300 | 300 |
| Solvent Temperature | °C. | −34 | −34 |
| Gas Compression | (BHP) | 1888 | 1820 |
| Propane Refrigeration | (BHP) | 233 | 214 |
| LS Pump (actual-recov) | (BHP) | 402 | 405 |
| TOTAL BHP REQUIRED BY PROCESS | | 2523 | 2439 |
| BHP PER LB-MOL OF GAS RECOVERED | | 1.34 | 1.30 | case.

TABLE 3

EFFECT OF INCREASING SOLVENT MOLECULAR WEIGHT ON NITROGEN REJECTION PROCESS[1]

| PROCESS VARIABLES | | $C_9$ | $C_{10}$ | $C_{12}$ |
|---|---|---|---|---|
| Solv/Gas Ratio | (molar) | 6.0 | 6.2 | 7.1 |
| Reflux/Gas Ratio | (molar) | 0.07 | 0.07 | 0.07 |
| Natural Gas Recovered | (mol %) | 99.3 | 99.3 | 99.4 |
| $N_2$ In Nat. Gas Rec. | (mol %) | 1.7 | 1.7 | 1.9 |
| $N_2$ In Gas Rejected | (mol %) | 95.3 | 95.3 | 95.4 |
| HP Flash Pressure | (psia) | 140.0 | 140.0 | 140.0 |
| MP Flash Pressure | (psia) | 42.0 | 42.0 | 42.0 |
| LP Flash Pressure | (psia) | 12.0 | 12.0 | 12.0 |
| Gas Compressor | (stages) | 3 | 3 | 3 |
| Absorber Stages | (recovery/purification.) | 8/2 | 8/2 | 8/2 |
| Total Solvent Losses | (ppm-wt) | 300 | 94 | 13 |
| Solvent Temperature | °C. | −34 | −34 | −34 |
| Gas Compression | (BHP) | 1888 | 1886 | 1913 |
| Propane Refrigeration | (BHP) | 233 | 233 | 233 |
| LS Pump (actual-recov) | (BHP) | 402 | 456 | 592 |
| TOTAL BHP REQUIRED BY PROCESS | | 2523 | 2575 | 2738 |
| BHP PER LB-MOL OF GAS RECOVERED | | 1.35 | 1.37 | 1.46 |

[1]FIG. 3 with solvent recovery

EXAMPLE IV

This example is based on the feedstock of Example I and the flowscheme depicted in FIG. 3 to illustrate the advantage of returning a reflux stream to the purification zone on the performance of the process. The absorber for the Refluxed case has an additional two theoretical stages in the purification zone which are not

EXAMPLE V

Table 5 illustrates examples of hydrocarbon solvents, such as paraffins, isoparaffins, naphthenes, olefinic naphthenes, mono-olefins, alkylbenzenes, and aromatics such as benzene, and toluene, and xylene which may be used in pure form or in mixtures in the process of this invention.

TABLE 5

EXAMPLES OF PREFERRED SOLVENTS FOR USE AS A PURE SOLVENT OR IN MIXTURES THEREOF OR IN MIXTURES WITH OTHER HYDROCARBONS

| SOLVENT | CARBON NO. | NORMAL B.P. (F.) | FREEZING POINT (F.) | S.G. 60/60 | VISCOSITY 100 F. CS |
|---|---|---|---|---|---|
| Paraffins | | | | | |
| N-Nonane | $C_9$ | 303.5 | −64.3 | 0.722 | 0.809 |
| 3-Methyloctane | $C_9$ | 291.6 | −161.7 | 0.725 | — |
| N-Decane | $C_{10}$ | 345.5 | −21.4 | 0.734 | 1.004 |
| 2-Methylnonane | $C_{10}$ | 332.7 | −102.3 | 0.731 | — |
| N-Undecane | $C_{11}$ | 384.6 | −14.1 | 0.744 | 1.236 |
| N-Dodecane | $C_{12}$ | 421.3 | 14.7 | 0.753 | 1.512 |
| Naphthenes | | | | | |
| N-Butylcyclopentane | $C_9$ | 313.9 | 162.4 | 0.789 | 0.908 |
| N-Pentylcyclopentane | $C_{10}$ | 356.9 | −117.0 | 0.795 | 1.128 |
| N-Butylcyclohexane | $C_{10}$ | 357.8 | −102.4 | 0.803 | 1.251 |
| Cis-Decahydronaphthalene | $C_{10}$ | 384.5 | −45.4 | 0.901 | — |
| Tns-Decahydronaphthalene | $C_{10}$ | 369.2 | −22.7 | 0.874 | — |
| N-Hexylcyclopentane | $C_{11}$ | 397.2 | −99.0 | 0.801 | 1.415 |
| N-Pentylcyclohexane | $C_{11}$ | 398.6 | −71.6 | 0.808 | 1.556 |
| N-Heptylcyclopentane | $C_{12}$ | 435.0 | −63.0 | 0.805 | 1.748 |
| N-Hexylcyclohexane | $C_{12}$ | 436.5 | −45.5 | 0.812 | 1.94 |
| N-Octylcyclopentane | $C_{13}$ | 470.3 | −47.0 | 0.809 | 2.13 |
| N-Heptylcyclohexane | $C_{13}$ | 472.8 | −23.0 | 0.815 | 2.38 |
| N-Nonylcyclopentane | $C_{14}$ | 503.6 | −20.0 | 0.812 | 2.57 |
| Mono-Olefins | | | | | |
| 1-Decene | $C_{10}$ | 339.1 | −87.3 | 0.745 | 0.877 |
| 1-Undecene | $C_{11}$ | 378.8 | −56.5 | 0.754 | 1.085 |
| 1-Dodecene | $C_{12}$ | 416.0 | −31.4 | 0.762 | 1.33 |
| 1-Tridecene | $C_{13}$ | 451.0 | −9.5 | 0.769 | 1.61 |
| Alkylbenzenes | | | | | |
| N-Propylbenzene | $C_9$ | 318.6 | −147.1 | 0.867 | 0.794 |
| N-Butylbenzene | $C_{10}$ | 362.0 | −126.3 | 0.865 | 0.947 |
| 1,3-Diethylbenzene | $C_{10}$ | 358.0 | −119.0 | 0.868 | — |
| 1,2-Diethylbenzene | $C_{10}$ | 362.2 | 24.2 | 0.884 | — |
| Tetrahydronaphthalene | $C_{10}$ | 405.7 | −32.4 | 0.975 | — |
| N-Pentylbenzene | $C_{11}$ | 401.7 | −103.0 | 0.863 | 1.188 |
| 1-Methylnaphthalene | $C_{11}$ | 472.4 | −22.9 | 1.024 | 2.209 |
| N-Hexylbenzene | $C_{12}$ | 439.0 | −78.0 | 0.862 | 1.462 |
| N-Heptylbenzene | $C_{13}$ | 474.0 | −54.0 | 0.861 | 1.778 |
| N-Octylbenzene | $C_{14}$ | 507.9 | −33.0 | 0.860 | 2.14 |

EXAMPLE VI

Example VI is based on the feedstock of Example I and the flowscheme shown in FIG. 3. The lean solvent employed was a $C_{10}$ paraffin solvent. The total solvent losses were maintained at 15 ppm. A series of cases were developed with a slightly different thermodynamic model than used in Examples I–IV to illustrate the improvement in product gas purity, as measured by the amount of nitrogen in the product gas, versus the ratio of reflux-to-feed mole ratio. The results of the cases are plotted in FIG. 4.

Figure 4:
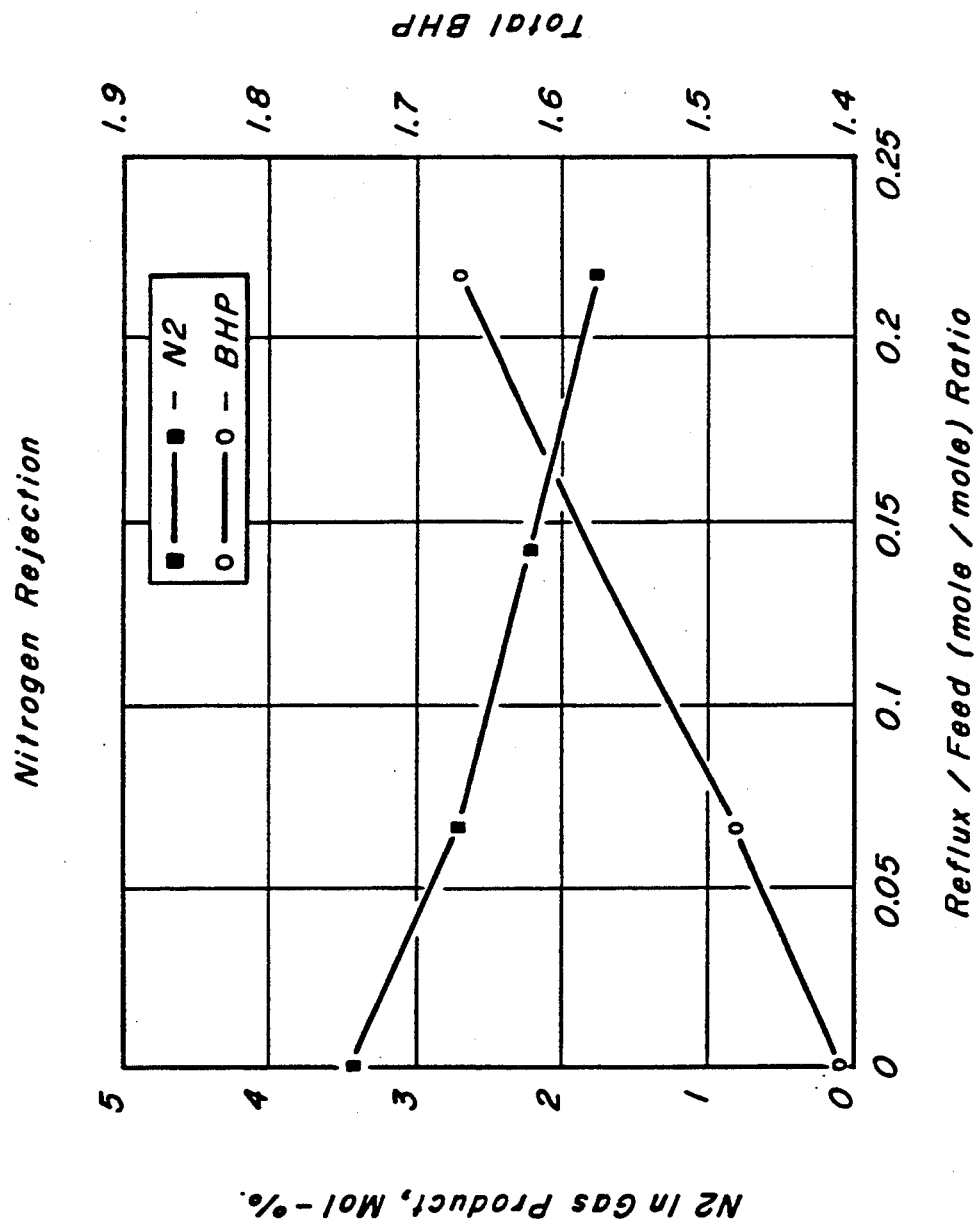
FIG. 4 is a chart which shows the effect of increasing the flow of light gas to the purification zone on the purity of the product gas, and the overall energy used in the process of the instant invention.

The process variables for the data shown in FIG. 4, are given in Table 6. Case D shows a case without the purification zone which is equivalent to a 0 reflux-to-feed molar ratio. A purification zone ling two theoretical stages was used with the three cases labelled A, B, and C as the reflux-to-feed ratio was increased to 0.22. The number of stages in the recovery zone and the relative pressures of the consecutive flash zones were held constant. The amount of nitrogen in the product gas decreased from about 3.4 mol % to 1.7 mol % for a corresponding increase in the reflux to feed mol ratio from 0 in Case D to about 0.22 in Case A. The cost of this improvement in terms of the energy requirements of the scheme is reflected in the ratio of the total BHP per mol of gas recovered. As the reflux to gas ratio was increased from 0, or no reflux to 0.22, the ratio of BHP per mole of gas recovered increased from about 1.41 in Case D to about 1.67 in Case A. Thus, the process with the reflux, purification zone and solvent recovery elements permitted a 200% improvement in product purity for about an 18% increase in the total BHP per mol of gas recovered.

TABLE 6

NITROGEN REJECTION VS REFLUX-TO-FEED MOL RATIO

| PROCESS VARIABLES | | A | B | C | D |
|---|---|---|---|---|---|
| Solv/Gas Ratio | (molar) | 5.2 | 4.9 | 4.7 | 4.5 |
| Solvent Temperature | (F.) | −30 | −30 | −30 | −30 |
| Reflux/Gas Ratio | (molar) | 0.22 | 0.14 | 0.07 | 0.0 |
| Natural Gas Recovered | (mol %) | 99.2 | 99.2 | 99.2 | 99.3 |
| $N_2$ In Nat. Gas Rec. | (mol %) | 1.72 | 2.21 | 2.71 | 3.45 |
| $N_2$ In Gas Rejected | (mol %) | 94.3 | 94.4 | 94.1 | 94.8 |
| HP Flash Pressure | (psia) | 140.0 | 140.0 | 140.0 | 140.0 |
| MP Flash Pressure | (psia) | 42.0 | 42.0 | 42.0 | 42.0 |
| LP Flash Pressure | (psia) | 12.0 | 12.0 | 12.0 | 12.0 |
| Gas Compressor | (stages) | 3 | 3 | 3 | 3 |
| Absorber Stages | (recov/purif) | 8/2 | 8/2 | 8/2 | 8/0 |

TABLE 6-continued

NITROGEN REJECTION VS REFLUX-TO-FEED MOL RATIO

| PROCESS VARIABLES | | A | B | C | D |
|---|---|---|---|---|---|
| Total Solvent Losses | (ppm-wt) | 15 | 15 | 15 | 15 |
| Gas Compression | (BHP) | 2140 | 2018 | 1892 | 1795 |
| Propane Refrigeration | (BHP) | 529 | 499 | 458 | 439 |
| LS Pump (actual-recov) | (BHP) | 463 | 444 | 421 | 409 |
| TOTAL BHP REQUIRED BY PROCESS | | 3132 | 2961 | 2771 | 2643 |
| BHP/LB-MOL OF GAS RECOVERED | | 1.67 | 1.58 | 1.48 | 1.41 |

EXAMPLE VII

Example VII is based on the process for the separation of a mixture of hydrogen and nitrogen from a refinery off-gas stream, such as an off-gas from a fluid catalytic cracking unit with the following composition:

| | Mol-% |
|---|---|
| $H_2$ | 40.00 |
| $N_2$ | 9.53 |
| CO | 0.53 |
| $CO_2$ | 1.60 |
| $H_2S$ | 3.41 |
| $CH_4$ | 22.68 |
| $C_2H_4$ | 9.09 |
| $C_2H_6$ | 9.29 |
| $C_3H_6$ | 2.83 |
| $C_3H_8$ | 0.48 |
| N—$C_4$ | 0.41 |
| N—$C_5$ | 0.15 |

The process scheme used in the non-cryogenic absorption process is the scheme depicted in FIG. 3. The feed rate to the process was 0.364 million $Nm^3$ per day (13.6 MMSCFD) at a pressure of about 1275 kPA (about 185 psia) and a temperature of about 38° C. (100° F.). The results of an engineering design simulation are shown in Tables 7 and 8. Table 7 shows the process material balance on a molar basis and Table 8 shows the process parameters. In Example VII, the product gas is produced at a pressure essentially equal to the feed pressure. The hydrogen-rich gas is rejected at a temperature lower than the feedstream temperature at a recovery of about 95% mol and at a purity of 72.9%. The solvent losses were maintained at a low level of 30 ppm, equivalent to about 3320 liters (877 gallons) annually using a $C_{10}$ paraffinic solvent admixed with natural gas liquids in a molar ratio of 85 to 15. The reflux gas returned to the purification zone was maintained at a level of 12 mol % of the feed rate to the process. The overall energy in BHP required by the process was 2,528, or about 1.68 BHP per 16 mol of total gas recovered, hydrogen-free gas product and the hydrogen-rich gas.

TABLE 7

HYDROGEN/NITROGEN REJECTION FROM REFINERY OFF-GAS OVERALL MATERIAL BALANCE

| Component, mol-% | Feedstock Gas | Hydrogen-rich Gas | Gas Product |
|---|---|---|---|
| $H_2$ | 40.00 | 72.92 | 4.42 |
| $N_2$ | 9.53 | 15.80 | 2.75 |
| CO | 0.53 | 0.78 | 0.26 |
| $CO_2$ | 1.60 | 0.07 | 3.25 |
| $H_2S$ | 3.41 | 0.69 | 6.36 |
| $CH_4$ | 22.68 | 6.15 | 40.56 |
| $C_2H_4$ | 9.09 | 0.87 | 17.98 |
| $C_2H_6$ | 9.29 | 1.44 | 17.77 |
| $C_3H_6$ | 2.83 | 0.92 | 4.93 |
| $C_3H_8$ | 0.48 | 0.16 | 0.83 |
| N—$C_4$ | 0.41 | 0.15 | 0.66 |
| N—$C_5$ | 0.15 | 0.05 | 0.22 |
| Lb Mols/Hr | 1500 | 779.0 | 721.0 |
| Pressure (kPa) | 1270 | 1260 | 1270 |
| Pressure (psia) | 170 | 168 | 170 |
| Temperature, °C. | 38 | 24 | 43 |

TABLE 8

HYDROGEN/NITROGEN REJECTION FROM REFINERY OFF-GAS PROCESS VARIABLES

| Solvent/Fuel Gas Ratio | (molar) | 5.8 |
|---|---|---|
| Solvent Temperature | (°C.) | −34 |
| Solvent: $C_{10}$ Paraffin/NGL | (mixture mol %) | 85/15 |
| Reflux/Fuel Gas Ratio | (molar) | 0.12 |
| Hydrogen Gas Recovered | (mol %) | 94.7 |
| Process Gas Compressor | (stages) | 3 |
| Absorber Stages | (recov/purif) | 8/2 |
| Equil. Solvent Losses | (ppm-wt/ Gal. Year) | 30/877 (1) |
| Gas Compression | (BHP) | 1,956 |
| Propane Refrigeration | (BHP) | 409 (2) |
| LS Pump (actual-recov) | (BHP) | 163 |
| TOTAL BHP REQUIRED BY PROCESS | | 2,528 |

(1) One year = 8000 hr.
(2) 1.1 MM Btu/hr

Other embodiments of the invention will be apparent to the skilled in the art from a consideration of this specification or practice of the invention disclosed herein. It is intended that the specification and examples be considered as exemplary only, with the true scope and spirit of the invention being indicated by the following claims.

What is claimed is:

1. A process for separating a light component from a hydrocarbon gas mixture comprising the following steps:
    (a) passing said gas mixture to a absorber having an upper recovery zone and a lower purification zone, said gas mixture contacting a lean solvent stream in said upper recovery zone to provide a light component stream and a first rich solvent stream and withdrawing said light component stream;
    (b) passing the first rich solvent stream to the lower purification zone and countercurrently contacting therein the rich solvent stream with a reflux stream and withdrawing a second rich solvent stream from said lower recovery zone;
    (c) passing said second rich solvent stream at a first pressure to a first flash zone of at least two flash zones to provide a first flashed liquid; and
    (d) introducing a combined gas stream comprising lean solvent to said first flash zone and contacting said first flashed liquid with said combined gas stream to provide a first flashed off-gas essentially free of lean solvent.

2. The process of claim 1 wherein said hydrocarbon gas mixture is a by-product stream of a hydrocarbon conversion process.

3. The process of claim 1 wherein said hydrocarbon gas mixtures is a refinery off-gas from a fluid catalytic cracking process.

4. The process of claim 1 wherein said hydrocarbon gas mixture is a by-product stream from an ethylene plant.

5. The process of claim 1 wherein said high pressure flash zone contains a contacting area within said high pressure flash zone.

6. The process of claim 1 further comprising passing said first flashed liquid at a second pressure to a second flash zone to provide a second flashed liquid and at least a portion of said combined gas stream.

7. The process of claim 6 further comprising recompressing said combined gas stream prior to introducing said combined gas to said first flash zone.

8. The process of claim 7 further comprising flashing said second flashed liquid in a third flash zone at a third pressure to provide a third flashed liquid and a further portion of said combined gas stream.

9. The process of claim 8 further comprising recompressing said further portion of said combined gas stream prior to introducing said combined gas to said first flash zone.

10. The process of claim 9 wherein said first pressure is higher than said second pressure and said second pressure is greater than said third pressure.

11. The process of claim 10 further comprising returning at least a portion of said third flash liquid to said absorption zone as said lean solvent.

12. The process of claim 11 wherein said light component is selected from the group consisting of hydrogen, nitrogen, helium, argon, carbon dioxide, carbon monoxide, and mixtures thereof.

13. A process for separating hydrogen from a hydrocarbon gas mixture comprising hydrogen, nitrogen and methane comprising the following steps:

(a) passing said gas mixture to an absorber, having an upper recovery zone and a lower purification zone, said gas mixture entering said adsorber at a point between said upper recovery zone and said lower purification zone, said gas mixture countercurrently contacting a lean solvent stream in said upper recovery zone to provide a hydrogen stream and a first rich solvent stream, and withdrawing said hydrogen stream comprising nitrogen from said upper recovery zone;

(b) passing said first rich solvent stream to said-lower purification zone in said absorber and countercurrently contacting therein said first rich solvent stream with a reflux stream and withdrawing a second rich solvent stream from said lower recovery zone;

(c) passing said second rich solvent stream to a high pressure flash zone at conditions effective to provide a high pressure liquid and introducing a combined gas stream comprising lean solvent to said high pressure flash zone and contacting said high pressure liquid with said combined gas stream to provide a high pressure off-gas essentially free of lean solvent;

(d) passing said high pressure liquid to a medium pressure flash zone at conditions effective to provide a medium pressure off-gas and a medium pressure liquid;

(e) passing said medium pressure liquid to a low pressure flash zone at conditions effective to provide a low pressure off-gas and said lean solvent stream;;

(f) passing said low pressure off-gas to a first-stage of at least a 3-stage compressor having the first stage, a second stage, and a third stage, and passing said medium pressure off-gas to the second stage of said 3-stage compressor, and passing said low pressure off-gas to the first stage of said 3-stage compressor to provide said combined gas stream comprising lean solvent, and withdrawing said combined gas stream from said second stage and withdrawing a product gas stream from said third stage;

(g) passing at least a portion of said product gas stream to said lower purification zone to provide said reflux stream of step (b).

14. The process of claim 13 wherein said hydrocarbon gas mixture is a by-product stream of a hydrocarbon conversion process.

15. The process of claim 13 wherein said hydrogen stream comprises nitrogen.

16. The process of claim 13 wherein said hydrocarbon gas mixtures is a refinery off-gas from a fluid catalytic ;cracking process.

17. The process of claim 13 wherein said hydrocarbon gas mixture is a by-product stream from an ethylene plant.

18. The process of claim 13 wherein said high pressure flash zone contains a contacting area within said high pressure flash zone.

19. The process of claim 18 wherein said contacting area comprises from 1 to 5 theoretical trays.

* * * * *